United States Patent
Katzer et al.

[11] 3,730,203
[45] May 1, 1973

[54] REDUCING PRESSURE ON LIQUIDS

[75] Inventors: Melvin F. Katzer, Danville; Willis G. Routson, Walnut Creek, both of Calif.

[73] Assignee: The Dow Chemical Company, Midland, Mich.

[22] Filed: Oct. 4, 1971

[21] Appl. No.: 186,478

Related U.S. Application Data

[63] Continuation-in-part of Ser. No. 869,531, Oct. 27, 1969, abandoned.

[52] U.S. Cl. ....................................137/14, 73/219
[51] Int. Cl. ..............................................F17d 3/00
[58] Field of Search................................137/1, 14, 73/219, 73/219, 221

[56] References Cited

UNITED STATES PATENTS 3,397,576  8/1968  Peres ........................73/219 X

*Primary Examiner*—Alan Cohan
*Attorney*—William M. Yates et al.

[57] ABSTRACT

A liquid which is detrimentally affected by shear, or which cannot be flowed through conventional pressure reducing devices, is reversibly worked against a second body of liquid on which work is done to reduce the pressure on the first liquid. Illustratively, liquid on which pressure is to be reduced is alternately flowed into each of two working conduits in liquid communication at one end through a liquid pressure reducing means. As liquid is introduced into one working conduit, corresponding volumes of liquid are flowed through the pressure reducing means and removed from the second working conduit. The total amount of liquid introduced into a working conduit at one time, however, is approximately equal to or less than the volume of a working conduit. As a consequence, the pressure reducing means always operates on a body of working liquid that recycles from one working conduit to the other, and this body of liquid absorbs the shear stresses associated with pressure reduction. A method and apparatus for the practice thereof are each provided.

11 Claims, 3 Drawing Figures

Patented May 1, 1973
3,730,203
2 Sheets-Sheet 1
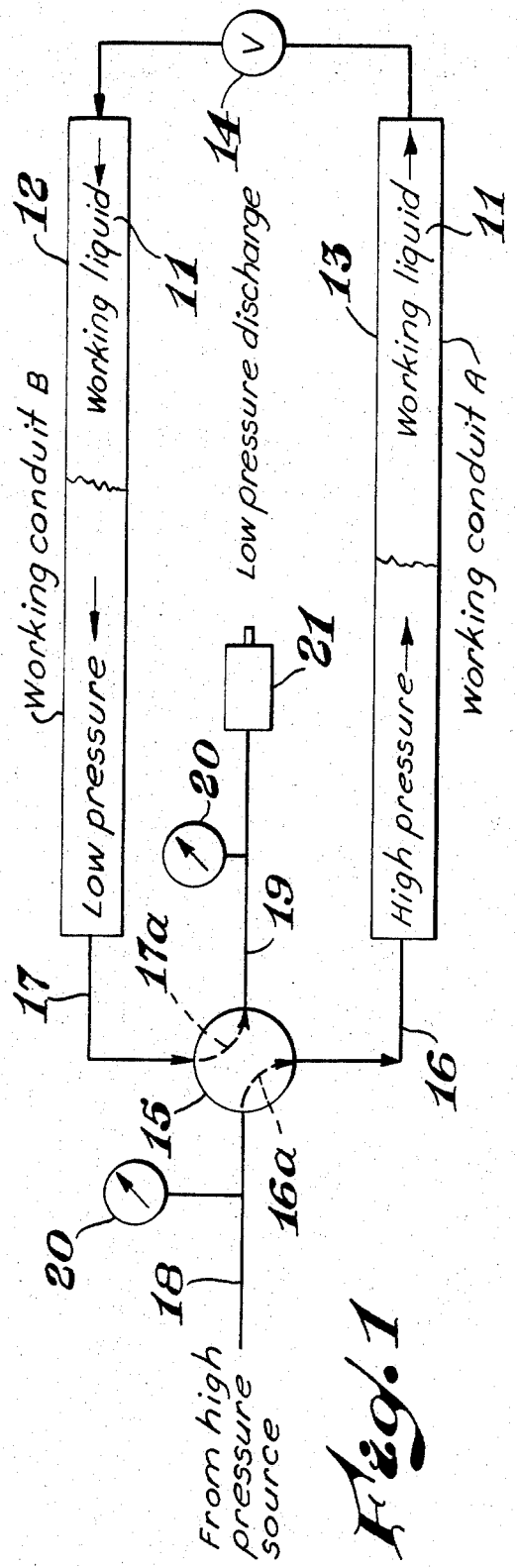
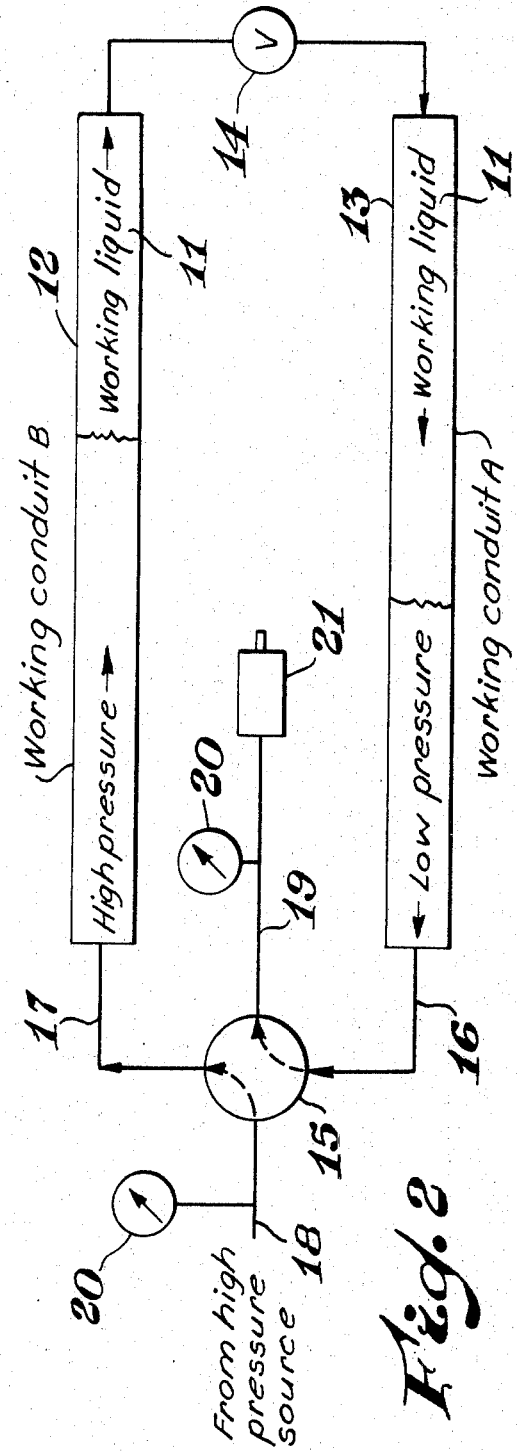
INVENTORS.
Melvin F. Katzer
BY Willis G. Routson
William R. Harris
ATTORNEY

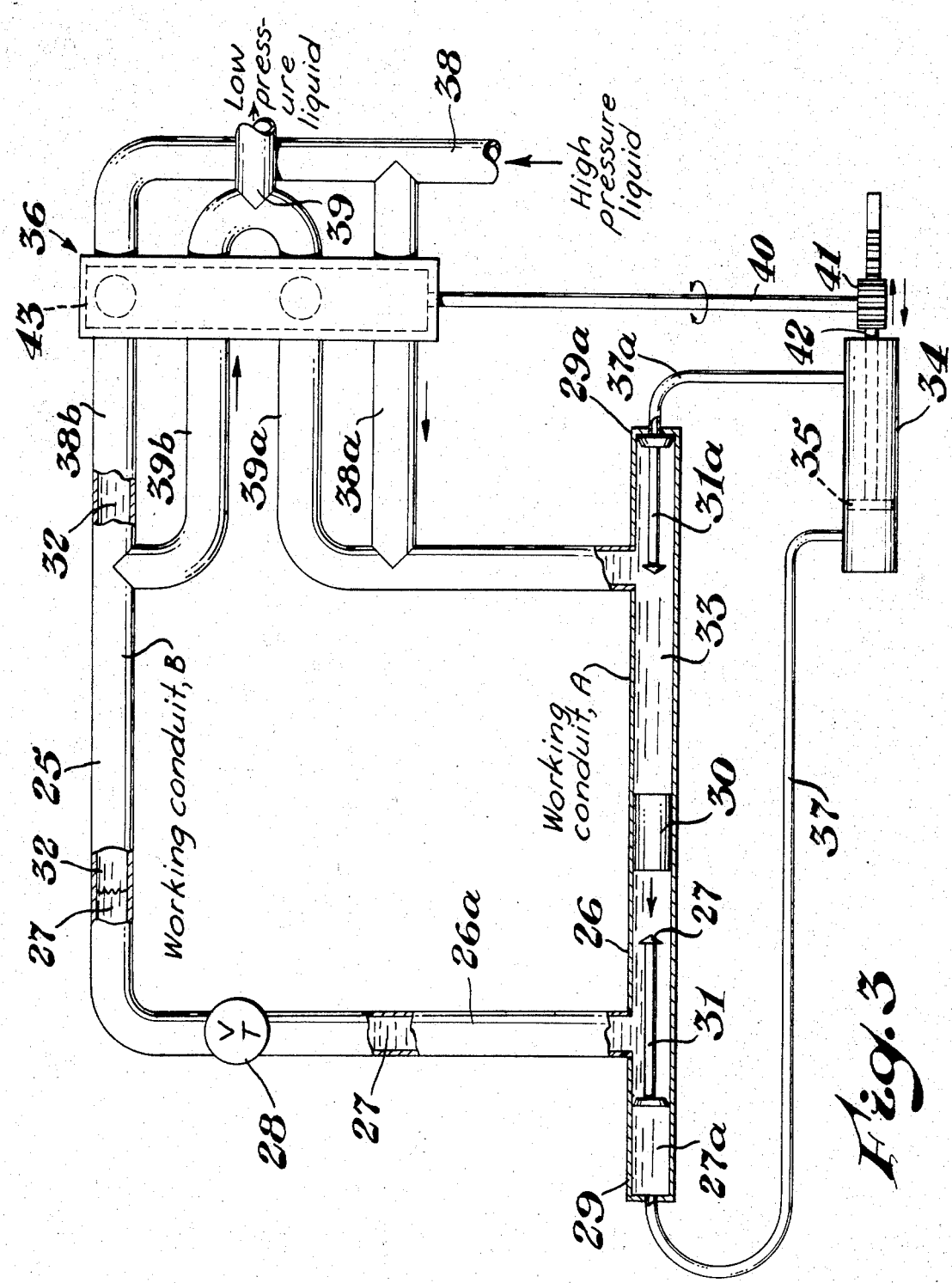

REDUCING PRESSURE ON LIQUIDS

CROSS-REFERENCE TO RELATED APPLICATION

The present application is a continuation-in-part of our previous application Ser. No. 869,531 filed Oct. 27, 1969 now abandoned.

The need frequently arises to reduce pressure on a liquid. Techniques developed for achieving pressure reduction generally involve throttling the liquid through an orifice or any convenient valve. When substantial pressure drops are required, as is often the case in water distribution systems for oil-field water-flooding, the energy loss across the valve is substantial and may cause severe eroding of equipment and property changes in the liquid. In the latter instance, it is known that sharp pressure reductions on polymer solutions result in degradation of the dissolved polymer. See U.S. Pat. No. 3,371,714.

It would be desirable, and it is a particular object of the instant invention, to provide a new method for reducing pressure on liquids.

A further object is to provide a method of reducing pressure on liquids whereby the liquids, on which pressure is reduced, are subjected to minimum shearing stress.

Still another object is to provide a pressure reducing method in which pressure reduction on a first liquid is achieved by work done on a second working liquid.

A still further object is to provide a method for reducing pressure on a liquid suspension of solids which would otherwise cause severe erosion of conventional pressure reducing devices.

A particular object is to provide an automated pressure reducing system.

The foregoing objects, and other benefits as will become apparent hereinafter, are achieved in the practice of the instant invention which comprises method and apparatus embodiments. In one embodiment, the invention comprises alternately flowing a volume of a liquid, on which the pressure is to be reduced, into one of two working conduits, said conduits being in liquid communication at one end through means for reducing pressure on a flowing liquid. As liquid is introduced into one of the working conduits, a corresponding volume of a working liquid is forced through the pressure reducing means and displaces an equal volume of liquid from a second working conduit. The amount of liquid introduced and displaced in any phase of a complete cycle within a given working conduit is preferably less than the total volume of the working conduit. This assures the presence within the conduit system of a given body of recycling working liquid, on which most, if not all, of the work is done to reduce pressure.

Other methods are available for providing minor pressure drops in shear-sensitive liquids and well-known devices such as throttle valves can be employed for accomplishing substantial pressure drops where shear-sensitivity of the liquid is not a problem. It is thus apparent that the method and apparatus of the present invention is particularly advantageous primarily for accomplishing substantial pressure reduction on liquids subject to degradation by shearing. By substantial pressure reduction is meant a reduction in pressure of at least about 50 pounds per square inch. As employed hereinafter in the present specification and claims "pounds per square inch" is represented by the symbol "psi." Thus, in practice, the method of the present invention is applied to shear-sensitive liquids initially at a pressure in excess of 50 psi and the above-described pressure reducing means is adjusted to provide a pressure drop of at least about 50 psi on the working liquid flowing between the working conduits at the predetermined flow rate of the system during a working cycle.

In the described manner, a given pressurized liquid is introduced into one working conduit and displaced from another under reduced pressure corresponding to the energy loss across the pressure reducing means. As will be apparent, the process is readily modified by the use of more than two working conduits, which communicate through the pressure reducing means. For instance, more than one working conduit can be used in parallel liquid flow on one side of the pressure reducing means, when it is desired to minimize thee length of working conduits.

Preferably, the amount of high pressure liquid introduced into a working conduit or system of conduits on one side of a pressure reducing means is less than about 90 percent of the volume of that system. This minimizes losses of working liquid from the reciprocating liquid. The cycling of introduction and displacement of the liquid is automated by a suitably phasing valve system to achieve essentially continuous liquid flow.

In the accompanying drawings, FIGS. 1 and 2 are schematic illustrations showing a reversibly pulsed body of working liquid maintained within a given system of working conduits to achieve pressure reduction and essentially continuous liquid flow. FIG. 3 illustrates another system of working conduits with a different valving system and a sensing pig to actuate the valve.

In FIG. 1, liquid enters working conduit A (13) from high pressure line 18 through passageway 16a of a four-way spool valve 15 and line 16. This forces working liquid 11 into working conduit B (12) through pressure reducing means 14, which may be a partially open ball or plug valve. Low pressure liquid is discharged from working conduit B through line 17, passageway 17a of spool valve 15 and then through the output line 19 on which there is a flow meter 21. The flow meter 21 measures the volume of liquid displaced from working conduit B and, at a predetermined volume, it actuates spool valve 15 (by means not illustrated). The spool valve then moves into the alternate operating position as shown in FIG. 2. Optional pressure gauges 20 measure the drop in pressure.

In this position, the entire sequence is reversed; liquid from high pressure line 18 flows through passageway 17a of spool valve 15 and through line 17 into working conduit B, thereby forcing the body of working liquid 11 to reverse its direction of flow through the pressure reducing means 14. Liquid from working conduit A, this time on the low pressure side of the pressure reducing means 14, is displaced from the system through lines 16, 16a and 19. The entire sequence is repeated when the flow meter 21 again senses the predetermined volume and actuates the valve rotating mechanism to begin the cycle over again.

FIG. 3 depicts another valving system to alternately pulse high and low pressure liquids into and from working conduits A (26 and 26a) and B (25) connected through pressure reducing means 28, wherein hydraulic energy is utilized to power the valving mechanism 36. The latter is accomplished through pistons 31 and 31a operated by means of a translating pig 30 contained in working conduit A. The pig 30 is driven towards piston 31 by high pressure liquid 33 entering working conduit A through line 38a, thereby forcing working liquid 27 through the pressure reducing means 28 and displacing low pressure liquid 32 from working conduit B through discharge line 39b. When operated in the reverse direction (not illustrated), the four-way stem valve 42 is rotated 90° to allow high pressure liquid to enter line 38b. This forces the pig 30 in the reverse direction and low pressure liquid is discharged through line 39a.

Each piston, 31 and 31a, operates within a piston chamber 29 and 29a respectively. Drive liquid 27a displaced from the piston chambers travels through lines 37 and 37a to drive auxiliary power piston 35 within chamber 34. Through a mechanical linkage of a ratchet 42 and gear 41, the reciprocating piston 35 reversibly rotates the shaft 40 of the four-way stem valve 43 through 90°. This in turn closes line 38a and 39b and opens lines 38b and 39a thereby reversing the flow of liquid through the working conduits A and B.

A significant advantage of the above described embodiment is that the need for a flow meter to actuate control valve positioning is obviated.

It will be readily apparent that a great variety of equivalent valving schemes are possible. For instance, the four-way spool valve illustrated in FIGS. 1 and 2 can be replaced by a system of 2 two-way valves coordinated by suitable electrical-mechanical interlinkages to open and shut appropriately. In addition to the illustrated ball and throttling valves for the pressure reducing means, liquid pressure can be reduced by flowing the working fluid across any physical interference. With liquid solutions or simple liquids, a porous bed as illustrated in U.S. Pat. No. 3,371,714 can be utilized.

In general, it is preferred, although not necessary, that the pressure drop be the same regardless of direction. In some processes, however, the alternate cycling of higher and lower pressures may be desired, and thus the instant invention contemplates a means for introducing cycling pressures as well as a given pressure into a liquid system. This latter advantage finds considerable utility in the operation of pulsed columns of solids. Such a capability is also of particular interest when injecting chemical reagents into geological formations where the cyclic pressure may have the effect of working the formation.

To obtain uniform pressure reduction in the output line, the pressure drops should be substantially equal regardless of the direction of flow through the pressure reducing means. This is readily accomplished through orifices designed to accomodate flow from either direction and by facing two common pinch valves, needle valves or gate valves to provide an identical flow path regardless of the direction of flow. A single ball valve or plug valve has been found to be a satisfactory simple arrangement which is also adjustable to vary the pressure drop as desired. Alternatively, the major pressure drop may be accomplished with a standard, interchangeable orifice plate mounted between two facing valves which are employed for minor adjustments of pressure drop initially and during continued use of the apparatus. In any case, once the initial engineering design has been fixed for a particular application, the pressure reducing means is adjusted to provide a pressure drop of at least 50 psi between the working conduits at the predetermined flow rate for the system.

Although illustrated in extended form, the working conduits can be coiled or curved as desired to form a more compact unit. Moreover, if extended, they may be extended upwardly or downwardly as well as horizontally, according to the demands and conveniences of available space.

In a special embodiment, vertical alignment of the working conduits facilitates the utilization of a working liquid of higher or lower specific gravity than the liquid on which pressure is to be reduced. The difference in density is utilized to minimize mixing of the liquids at their interface. As an example, the working conduits may be aligned vertically and mercury used as the working liquid through pressure reducing means at their bottom. If desired, a liquid which is immiscible with the liquid on which pressure is to be reduced, such as a liquid hydrocarbon, can be utilized as the working liquid to prevent mixing at the interface.

The use of liquid pigs at the interface of the working liquid and high pressure liquid can also be utilized to provide a phase change which can be detected to actuate the valving mechanisms. When liquids on which pressure is to be reduced include aqueous solutions and the working fluid is also an aqueous solution, it is desirable to utilize a thickened hydrocarbon as the liquid "pig." It is both immiscible and sufficiently cohesive to retain continuity in the operation of the valve.

In the usual embodiment in which the same or similar liquids are employed as the working liquid and the liquid on which pressure is to be reduced, it is desirable to minimize intermixing of the working liquid with the other liquid in the working conduits. In such practice it is preferred to employ working conduits having an effective length-to-diameter ratio of at least 10. As described above, a working conduit can consist of a single duct or of two or more parallel ducts connected suitably to the pressure reducing means and to the input-output valve system. As employed herein, the expression "effective length-to-diameter ratio" means the ratio of length to diameter of the working conduit itself when a single tube is employed as such conduit or the ratio of length to diameter for the largest diameter tube or tubes when a parallel array of two or more tubes is employed as the working conduit.

It has been observed in the practice of the invention that large pressure drops can be achieved without significant increases in the temperature of the working liquid. Some increase in temperature is to be expected, however, and as the system comes to equilibrium, adjustments in the pressure reducing means may be necessary until final equilibrium conditions are achieved to produce a given pressure drop.

The invention is particularly useful as applied to reducing the pressure on aqueous solutions of high molecular weight polymers as described in U.S. Pat. No. 3,371,714. In addition, the instant invention is applicable to the reduction of pressures on liquid systems which would plug or erode conventional pressure reducing apparatus. Examples of such systems are slurries of particulate solids in liquid which would have a tendency to erode or plug conventional valves and orifices.

This invention finds further utility for continuously removing shear sensitive food products, such as tomatoes and pears, from high pressure autoclaves into cans which are open to atomspheric pressure. Similar pressure reductions can also be achieved in the manufacture of beer and other carbonated beverages which are processed at a higher pressure and must be continuously brought down to atmospheric pressure. The described process and apparatus also makes it possible to throttle molten ceramics, metals and glass without subjecting the control or throttle valve to the extreme temperature conditions of the system. The working liquid in such instances should be essentially inert to the molten products. A lower melting and immiscible metal, such as lead, could be used for such a working liquid.

In the pulp and paper industry, it is desirable not to shear the long fibers in the mash. This invention provides a means to throttle and reduce the pressure on these slurries without affecting their properties. Similarly, in the latex industry, the shear sensitivity of many latex emulsions introduces a need for special care in reducing pressures. This method provides a unique solution to this problem.

What is claimed is:

1. A method for accomplishing substantial pressure reduction on a liquid subject to degradation by shearing, which comprises alternately flowing a volume of the liquid under a pressure greater than 50 psi into a first working conduit, which is in liquid communication with a second working conduit through means for reducing pressure on a flowing liquid, said means being adjusted to provide a pressure drop of at least 50 psi between said first conduit and said second conduit at the predetermined flow rate of the system, thereby displacing a volume of liquid from the second working conduit at a pressure at least 50 psi lower than the pressure on the liquid in said first conduit, and then flowing another volume of the liquid to be depressurized in the reverse direction into said second working conduit to displace liquid at said lower pressure from the first working conduit.

2. A method as in claim 1 wherein each of the working conduits has an effective length-to-diameter ratio of at least 10.

3. A method as in claim 1 wherein the volume of liquid to be depressurized introduced at any one time into a working conduit is about eqaul to or less than the volume of the working conduit to assure retention of a body of a working liquid within the working conduits and pressure reducing means to accomplish pressure reduction with minimal shearing of discharged low pressure liquid.

4. A method as in claim 3 wherein the working liquid is immiscible with the liquid on which pressure is reduced to prevent excessive intermixing at the liquid-liquid interfaces.

5. A method as in claim 3 wherein the working liquid has a specific gravity higher or lower than that of the liquid to be depressurized and the working conduits are maintained in an effective vertical alignment.

6. A method as in claim 1 wherein one of the working conduits contains a translating pig which actuates, at its extreme positions, movement of hydraulic pistons to produce hydraulic positioning of a valve mechanism to alternate flow of high pressure liquid from one conduit to another and to open corresponding discharge valves.

7. A method as in claim 1 wherein the liquid to be depressurized is an aqueous solution of a high molecular weight polymer.

8. A method as in claim 1 wherein the liquid to be depressurized is a shear-sensitive food product.

9. A method as in claim 1 wherein the liquid to be depressurized is a slurry of solids, which causes excessive erosion of pressure reducing means.

10. A method as in claim 1 wherein the liquid to be depressurized is a molten product.

11. A method as in claim 1 wherein different pressure reductions are induced in the low pressure liquid, depending upon the direction of liquid flow through the pressure reducing means, whereby pressure cycling is induced in the output of low pressure liquid.

* * * * *